UNITED STATES PATENT OFFICE.

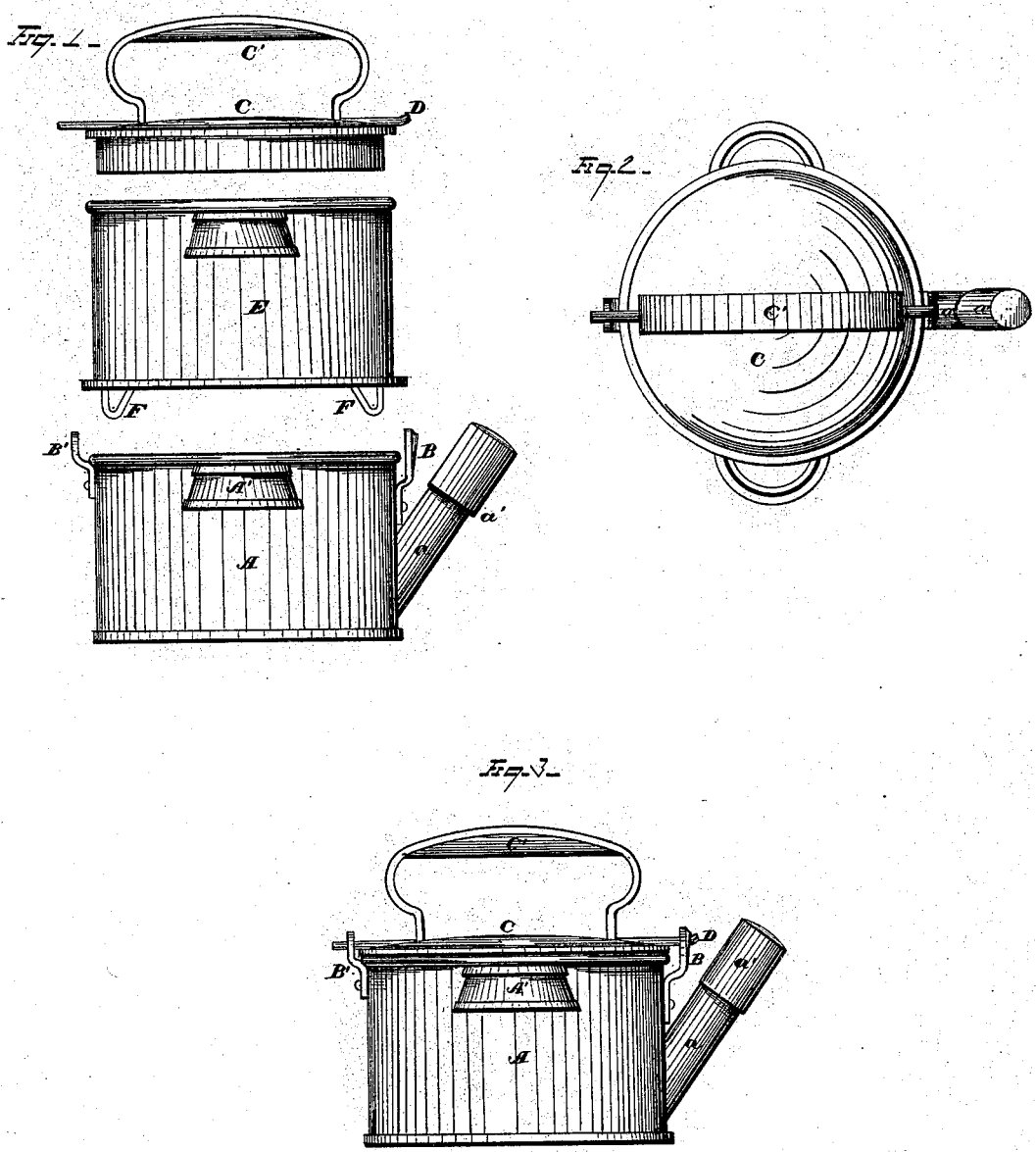

JOHN McCONNELL, OF CLEVELAND, OHIO.

IMPROVEMENT IN DOMESTIC BOILERS.

Specification forming part of Letters Patent No. 177,734, dated May 23, 1876; application filed May 3, 1876.

*To all whom it may concern:*

Be it known that I, JOHN McCONNELL, of Cleveland, in the county of Cuyahoga and State of Ohio, have invented certain new and useful Improvements in Culinary Implements; and I do hereby declare the following to be a full, clear, and exact description of the invention, such as will enable others skilled in the art to which it pertains to make and use it, reference being had to the accompanying drawings, which form part of this specification.

My invention relates to a device combining a variety of culinary implements.

In the drawings, Figure 1 shows an isometric view of the parts of my device as separated. Fig. 2 is a plan view of the same as united. Fig. 3 is a detached view, showing the method of latching or securing the lid or cover.

My invention consists in the following parts and combinations, as hereinafter specified and claimed, wherein A is the lower section or part, the same being a simple reservoir or pot of any desired fashion, size, or material.

The reservoir A may be provided with handles A' and spout or nozzle $a$, over the end of which may be fitted a movable cap, $a'$. The reservoir A is intended for use as a tea-kettle, or sauce-pan, or steamer, as will hereinafter appear.

Upon the reservoir A are provided the loops or perforated ears B B', one of which (as shown at B) is a spring, and is made to belly outward, and is notched at the top, as shown in Fig. 3 of the drawings.

The lid C is provided with a suitable handle, C', and lugs D, placed opposite each other and projecting from the rim of the lid C. One of these lugs is made shorter than the other, and is slightly hooked upward.

By the provisions above named an effective tea-kettle may be constructed from the reservoir A and lid C, by first placing the longer lug D into the loop B', and pressing the shorter hooked lug down upon the spring-loop B, which will yield and snap itself upon the said hooked lug.

By means of the notched and bellied shape of the spring-loop B, the hooked lug is properly guided into the perforation, and when the pot or kettle is lifted by the handle C', the upward hook of the shorter lug D will prevent any tendency of the lid being pulled off; but, on the contrary, will insure its greater security.

When the reservoir A is desired to be utilized as a sauce-pan or the like, the cap $a'$ is adjusted, and the spout or nozzle $a$ will then serve as a handle.

E is a reservoir, having a perforated bottom and a rim or lugs, F, upon its lower surface, whereby it may be fitted over or upon the reservoir A. The reservoir E is intended to be used as a steamer, or the like, and when so employed the lid C is made to cap the reservoir E, while the said reservoir rests upon the reservoir A, as shown in the drawings.

Any number of reservoirs similar to E may be piled one upon another above the reservoir A, and the whole capped by the lid C. Each being only separated by their perforated bottoms, steam from the reservoir A can act equally well in all.

If, during the process of steaming, more water should be needed in the reservoir A, the cap $a'$ may be removed and water supplied through the spout $a$.

By my device, as herein shown, I have produced a tea-kettle, the entire top or "breast" of which is removable—a feature which I am not aware has heretofore been shown.

What I claim is—

1. The reservoir A, provided with the spout or nozzle $a$, in combination with the loops or ears B B', and removable cover or lid provided with the lugs D, substantially as and for the purposes shown.

2. The combination, with the spring-loop B, constructed as shown, of the lid C and lug D, substantially as and for the purpose shown.

3. The combination, with the vessel A, provided with spout $a$ and cap $a'$, of the steamer E, constructed with a lower flange, that it may rest on the top of vessel A, and a cover, C, adapted to snugly fit either vessel A or steamer E, substantially as and for the purpose specified.

In testimony whereof I have signed my name to this specification in the presence of two subscribing witnesses.

JOHN McCONNELL.

Witnesses:
L. L. LEGGETT,
FRANCIS TOUMEY.